UNITED STATES PATENT OFFICE.

EDWARD BAINES, OF NEW YORK, N. Y.

MANUFACTURE OF ELECTRIC BATTERIES.

SPECIFICATION forming part of Letters Patent No. 636,938, dated November 14, 1899.

Application filed June 7, 1898. Serial No. 682,861. (No specimens.)

*To all whom it may concern:*

Be it known that I, EDWARD BAINES, a subject of the Queen of Great Britain, residing at New York, (Brooklyn,) in the county of Kings, in the State of New York, have invented certain new and useful Improvements in Secondary Electric Batteries and in Methods of Manufacturing the Same, of which the following is a specification.

My invention relates to that class of battery known as the "pasted-plate" battery.

The object of my invention is to obtain the use of finely-divided charcoal, as well as lead oxid, as active material in secondary electric batteries and to obtain a greater material strength in the negative electrode.

We learn from chemistry that charcoal in a finely-divided state has the property of absorbing and condensing within its pores many times its volume of oxygen.

I obtain the object of my invention in the following manner: I mix lead oxid with sulfuric acid to form a paste, such as is now used in secondary electric batteries, and to this paste I add finely-divided charcoal, and this paste of lead oxid, sulfuric acid, and finely-divided charcoal I pack into grids, frames, or supports of lead, and when it is dry and hard it is ready for use. The active material for the positive electrode of my battery is the ordinary spongy lead now in use. While the proportions of lead oxid and finely-divided charcoal may be greatly varied without injury to my invention, I find that when I use one ounce of finely-divided charcoal to two pounds of lead oxid I obtain excellent results. My reason for using charcoal in a finely-divided condition is that when the battery is being charged it will absorb and condense oxygen in its pores. Charcoal-dust or lump-charcoal is of no use for my purpose. I next assemble my electrodes in the usual manner of setting up a secondary battery and immerse them in dilute sulfuric acid—say a twenty-per-cent. solution—and then I pass electric current through the battery until it is charged.

I do not bind myself to use a positive electrode of already-formed spongy lead, as the material in the positive electrode may be sulfate of lead, which will be converted into spongy lead by charging and discharging the battery. The electrodes for my battery may be formed up separately, and I prefer this method, as the finely-divided charcoal in my negative electrode is already-formed active material, and it would be a waste of time and electric current to act upon it while the material in the positive electrode is being converted into spongy lead. It is the negative electrode of secondary batteries which wears out rapidly; but the negative electrode of my battery is so hard that when I have subjected one of my batteries to such an intense current of electricity that the positive electrode is bent into the form of a saucer my negative electrode is not in any way injured.

My battery is specially adapted for use in ships and railroad-cars, as I use no packing between the electrodes.

I make no claim to anything new in the manufacture of lead sulfate. Neither do I claim anything new in the supports used in secondary batteries or in the form thereof; nor do I make any claim to a compound of charcoal and lead oxid mixed with water or viscous matter or to any compound of lead oxid and charcoal in a dry state. Neither do I claim, broadly, the use of charcoal or lead sulfate in secondary batteries; nor do I claim the spongy lead in the positive electrode.

What I claim as my invention is—

In the manufacture of a secondary electric battery the method of compounding lead oxid, sulfuric acid and finely-divided charcoal to wit: first mixing lead oxid and sulfuric acid to form a binder and second incorporating finely-divided charcoal with this binder substantially as and for the purpose specified.

EDWARD BAINES.

Witnesses:
FRANK G. SMITH,
J. L. MORIARTY.